UNITED STATES PATENT OFFICE.

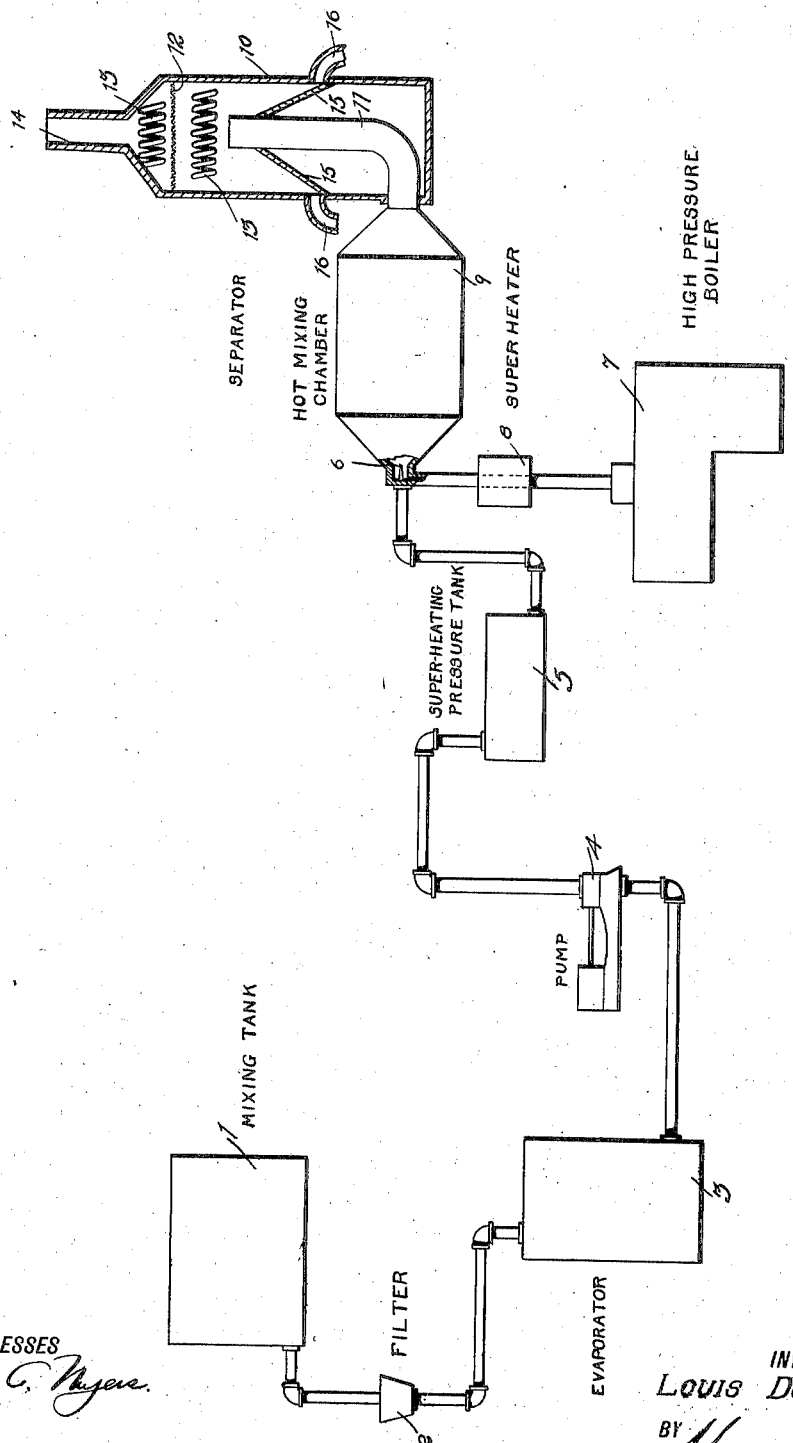

LOUIS DOONAR, OF BEND, OREGON.

PROCESS OF PRODUCING DEHYDRATED MINERAL SALTS.

1,308,403.  Specification of Letters Patent.  Patented July 1, 1919.

Application filed December 27, 1917.  Serial No. 209,153.

*To all whom it may concern:*

Be it known that I, LOUIS DOONAR, a citizen of the United States, and a resident of Bend, in the county of Deschutes and State of Oregon, have invented a new and useful Improvement in Processes of Producing Dehydrated Mineral Salts, of which the following is a specification.

My invention relates to improvements in processes for producing dehydrated mineral salts, and it consists in the steps hereinafter specified.

An object of my invention is to provide an economical process for extracting the moisture from salts, more particularly for extracting the water of crystallization from such salts as sodium carbonate.

A further object of my invention is to provide a process which is continuous, that is to say, one in which the material may be constantly fed in at one end of the apparatus and is delivered at the other end of the apparatus in a water-free or anhydrous condition.

A further object of my invention is to provide a process for extracting water from salts, by means of which the operation is accomplished in a minimum of time.

Other objects and advantages will appear in the following specification, and the novel features of the invention will be particularly pointed out in the appended claims.

My invention is illustrated in the accompanying drawing, which is a diagrammatic view of the apparatus used in the process.

In carrying out my invention, sodium carbonate or other salt from which the water is to be removed, is first dissolved in water to the point of saturation at the ordinary boiling point of water. This is done in a mixing tank, such as that shown at 1 in the drawing. The solution is then passed through a filter 2, where it is filtered, and then is conducted to an evaporator where the solution is brought to its highest point of saturation.

The solution is now pumped by means of the pump 4 into a superheating pressure tank 5, where it is heated within a few degrees of its boiling point. It will be understood that the pressure in this pressure tank is far above the atmospheric pressure, so that the solution which has not quite attained its boiling point in the heating tank 5, is in fact, far beyond its boiling point at atmospheric pressure. Passing out of the superheating pressure tank 5, the liquid is atomized at 6, by means of steam or hot air. The steam may be generated by a boiler 7, its temperature increased by a superheater 8, after which it passes through a pipe to the atomizer 6, so that the atomized solution is injected into a hot mixing chamber 9. From the mixing chamber 9, the atomized solution is conducted to a separator 10. In the drawing, I have shown this separator as consisting of a vertically extending pipe 11 disposed within the separator beneath a screen 12. The latter may be of cloth or other material of fine mesh. Heating coils 13 are disposed within the separator 10, the idea being to maintain the temperature of the steam so that the latter is in a dry state. The dry steam passes out through an exit pipe 14, but the dry salt is precipitated upon the inclined bottoms 15 of the separator, and may pass outwardly through the pipes or chutes 16.

It will be observed that the main features of the invention consist in atomizing a concentrated solution of the salt and maintaining a high temperature so that the water in the salt which includes the water of crystallization, is changed into steam which is in a dry state, and then separating the salt from the steam.

While I have shown a boiler and a superheater for the steam, it is obvious that hot air may be used and may be kept at such a temperature that the water contained in the salt is maintained in a state of dry steam until the separation has been effected.

The apparatus disclosed in the present application forms no part of the present invention. Any means for atomizing a concentrated solution and for maintaining a high temperature while separating the dry steam from the dry salt might be used without departing from the spirit of the invention.

The product which is turned out by the herein described process is of great purity, this being one of the features of the invention.

I claim:

1. The herein described process of producing dehydrated mineral salts, which consists in providing a hot, saturated solution of the salt, superheating the solution under pressure, to a point just below the boiling point of the solution at the pressure to which it is subjected, atomizing the superheated solution by means of a hot gas, and maintaining the atomized solution and gas at a temperature sufficient to keep all the moisture of the salt in a state of dry steam, and separating the dry salt from the dry steam.

2. The herein described process of producing dehydrated mineral salts, which consists in providing a hot, saturated solution of the salt, superheating the solution under pressure, to a point just below the boiling point of the solution at the pressure to which it is subjected, atomizing the superheated solution by means of superheated steam, and maintaining the atomized solution and superheated steam at a temperature sufficient to keep all the moisture of the salt in a state of dry steam, and separating the dry salt from the dry steam.

3. The herein described process of producing dehydrated mineral salts, which consists in preparing a saturated solution of the salt, heating the solution under pressure, atomizing the heated solution by means of a hot gas, and maintaining the atomized solution and gas at a temperature sufficient to keep all the moisture of the salt in a state of dry steam, and separating the dry salt from the dry steam.

4. The herein described process of producing a dehydrated salt which consists in first preparing a saturated solution of the salt in water, heating the solution under pressure, atomizing the heated solution by means of a hot gas, and maintaining the atomized solution and gas at a temperature sufficient to keep all of the moisture of the salt in a state of dry steam, and separating the dry salt from the dry steam.

5. The herein described process of removing the water of crystallization from a mineral salt which consists in mixing the salt with water until a concentrated solution is obtained, heating the solution, atomizing the heated solution, and maintaining the atomized solution at a temperature sufficient to keep all the moisture of the salt in a state of dry steam, and separating the dry salt from the dry steam.

LOUIS DOONAR.

Witnesses:
M. E. COLEMAN,
H. C. ELLIS.